United States Patent [19]
Suverkropp et al.

[11] 3,891,702
[45] June 24, 1975

[54] 1-UREIDO-5-AMINOCAPRONAMIDE

[75] Inventors: Geertrudes H. Suverkropp, Geleen; Werner Reichrath, Stein, both of Netherlands

[73] Assignee: Stamicarbon, N.V., Geleen, Netherlands

[22] Filed: Apr. 8, 1974

[21] Appl. No.: 459,207

Related U.S. Application Data

[60] Division of Ser. No. 348,519, April 6, 1973, which is a continuation of Ser. No. 211,713, Dec. 23, 1971, abandoned.

[52] U.S. Cl. .......................... 260/553 R; 260/534 L
[51] Int. Cl. .................... C07c 127/14; C07c 99/00; C07c 101/24
[58] Field of Search.......... 260/553 R, 534 L, 534 E

[56] References Cited
UNITED STATES PATENTS

| | | | |
|---|---|---|---|
| 2,870,201 | 1/1959 | Pollack............................ | 260/534 L |
| 2,921,091 | 1/1960 | Shapiro et al................... | 260/553 R |
| 2,928,872 | 3/1960 | Shapiro et al................... | 260/553 R |
| 2,976,218 | 3/1961 | Gorton et al................ | 260/534 L X |
| 3,684,811 | 8/1972 | Petersen...................... | 260/553 R X |
| 3,803,231 | 4/1974 | Fuhrmann et al........... | 260/534 L X |

Primary Examiner—Allen B. Curtis
Attorney, Agent, or Firm—Cushman, Darby & Cushman

[57] ABSTRACT

A process is disclosed for the preparation of lysine and lysine compounds wherein a mixture of 5-(3-cyanopropyl)-hydantoin and 1-ureido-4-cyanovaleramide is obtained and hydrogenated in the presence of a catalyst to a mixture of 5-(4-aminobutyl)-hydantoin and 1-ureido-5-aminocapronamide, which in turn is hydrolyzed to lysine or a lysine compound.

1 Claim, No Drawings

1-UREIDO-5-AMINOCAPRONAMIDE

This is a divisional application of my earlier copending application Ser. No. 348,519, filed Apr. 6, 1973, which in turn was a continuation of my earlier application Ser. No. 211,713, filed Dec. 23, 1971, now abandoned.

The present invention relates to a process for the preparation of lysine or a lysine compound in which 5-(3-cyanopropyl)-hydantoin is hydrogenated to 5-(4-aminobutyl)-hydantoin, which in turn is hydrolyzed to lysine or a lysine compound.

It is known from U.S. Pat. No. 2,688,023 that 4-cyanobutyraldehyde can be converted into 5-(3-cyanopropyl)-hydantoin by reacting it with a cyanide reactant, an ammonium reactant and a carbonate reactant. In this known process, the resulting reaction mixture is rendered slightly acidic and heated in order to improve product purity and yield.

It has now been found that by maintaining the pH above 7, the said reaction of 4-cyanobutyraldehyde will not only form 5-(3-cyanopropyl)-hydantoin, but also the compound 1-ureido-4-cyanovaleramide and that in an acid medium, however, this last mentioned compound is, converted into the 5-(3-cyanopropyl)-hydantoin when heated.

Therefore, if the pH of the resulting reaction mixture is lowered to a value of less than 7 and the reaction mixture heated, 5-(3-cyanopropyl)-hydantoin can be obtained as the desired reaction product. Although this might appear to be a desirable result in view of the subsequent conversion of the 5-(3-cyanopropyl)-hydantoin into end-product lysine, it has been found that this technique is attended by the formation of undesirable by-product compounds as a result of the hydrolysis of the nitrile group.

On the other hand, if the pH of the reaction mixture is maintained above at least about 7, a solid product can be then separated off from the reaction mixture, which product contains about 0.10 to about 0.25 mole of 1-ureido-4-cyanovaleramide for every mole of 5-(3-cyanopropyl)-hydantoin. From this solid product, 1-ureido-4-cyanovaleramide, which compound has not so far been described in literature, can be recovered in a virtually pure state.

It has further been found that said 1-ureido-4-cyanovaleramide compound can be hydrogenated to the new compound 1-ureido-5-aminocapronamide in the same manner as the 5-(3-cyanopropyl)-hydantoin. Moreover, this new compound 1-ureido-5-aminocapronamide can very suitable be hydrolyzed to form lysine using hydrolysis conditions which are essentially equivalent to the hydrolysis conditions normally used for the formation of lysine from 5-(4-aminobutyl)-hydantoin.

Therefore, according to the present invention, rather than operating the conversion of 4-cyanobutyraldehyde so as to optimize the formation of 5-(3-cyanopropyl)-hydantoin, this conversion is conducted so as to maintain the 1-ureido-4-cyanovaleramide formed, at the same time avoiding the formation of undesirable by-product compounds. The resulting mixture of 5-(3-cyanopropyl)-hydantoin and 1-ureido-4-cyanovaleramide is then hydrogenated to a mixture of 5-(4-aminobutyl)-hydantoin and 1-ureido-5-aminocapronamide, and this hydrogenated mixture can then be readily converted into lysine by hydrolysis.

In carrying out this process according to the present invention, it is possible to obtain a high conversion of the mixture of 5-(3-cyanopropyl)-hydantoin and 1-ureido-4-cyanovaleramide into lysine and hence it is not necessary to convert the 1-ureido-4-cyanovaleramide into 5-(3-cyanopropyl)-hydantoin by heating the said mixture in an acid medium as in the prior art process.

The hydrogenation of the mixture of 5-(3-cyanopropyl)-hydantoin and 1-ureido-4-cyanovaleramide is carried out, with the aid of a hydrogenation catalyst, in a solvent which is inert under the reaction conditions, and in which the mixture to be hydrogenated is substantially soluble. Examples of suitable solvents are water, alcohols, such as methanol, ethanol, isopropanol, butanols and glycols, and ethers such as dioxane and tetrahydrofuran.

An appropriate catalyst for use in the hydrogenation may be selected from known hydrogenation catalysts. Examples of suitable hydrogenation catalysts are platinum, palladium, nickel and cobalt. Preferably, nickel or cobalt is used.

The hydrogenation is carried out at an elevated temperature for instance between about 50° to 250°C, and under a hydrogen pressure. The partial hydrogen pressure may be varied within wide limits, but preferably will fall somewhere between about 1 to 200 atmospheres.

The subsequent hydrolysis of the mixture of 5-(4-aminobutyl)-hydantoin and 1-ureido-5-aminocapronamide can very suitably be carried out in an acidic or alkaline medium, and preferably at an elevated temperature, for instance, at a temperature of about 80° to 250°C. A suitable pressure should be chosen so that the reaction mixture is maintained in the liquid phase, for instance, the autogenic pressure.

The hydrolysis will result in an end-product of lysine or a lysine compound, depending on the hydrolysis medium. For example, if hydrochloric acid is employed for the hydrolysis, lysine, as such or as lysine monohydrochloride or lysine dihydrochloride, can be recovered from the hydrolyzed mixture. On the other hand, if sodium hydroxide is employed in the hydrolysis medium, lysine or sodium lysinate can be recovered from the hydrolysis mixture.

The process of the invention will be illustrated in greater detail in the following examples.

EXAMPLE 1

Preparation of a mixture of 5-(3-cyanopropyl)-hydantoin and 1-ureido-4-cyanovaleramide.

To a reaction flask provided with a stirrer and a reflux cooler, 200 milliliters of ammonia water (25% by weight of $NH_3$), 31 g of ammonium carbonate and 9 milliliters of liquid hydrogen cyanide were added. At approximately 25°C and with continuous stirring, 19.8 g of 4-cyanobutyraldehyde were added over a period of 15 minutes. The mixture was stirred for 30 minutes at 25°C after which the mixture temperature was raised to 60°C and stirred for an additional 4 hours at the higher temperature.

The resulting reaction mixture was dried by evaporation under reduced pressure (18 mm Hg), and a residue of 35 g of white crystalline product was obtained. From the nuclear-magnetic resonance spectrum of this white crystalline product, it was determined that 5-(3-cyanopropyl)-hydantoin and 1-ureido-4-cyanovaleramide were present in a molar ratio of 85:15. From the thin-layer chromatogram, it was further determined that, except for the compounds mentioned, there were practically no other substances present. By titration of a pyridine solution of the resulting product with tetrabutylammoniumhydroxide, it was found that the product contained 83.4% by weight of 5-(3-cyanopropyl)-hydantoin.

The above analysis establishes that the conversion of the 4-cyanobutyraldehyde into a mixture of 5-(3-cyanopropyl)-hydantoin and 1-ureido-4-cyanovaleramide was practically quantititative.

EXAMPLE 2 isolation, by separation, of 1-ureido-4-cyanovaleramide from the mixture obtained according to example 1.

Of the white crystalline product obtained according to example 1, 17.5 g were dissolved in 150 milliliters of ammonia water (10% of $NH_3$ by weight). The resulting solution was passed over 150 milliliters of a strongly basic ion exchanger (polystyrene linked to 4–8% of divinyl benzene containing trimethylammonium groups, known by the trade name of Dowex 21 K) in the OH form, and the ion exchanger was washed with distilled water until the extract reacted neutrally. The total quantity of extract was concentrated by evaporation at a reduced pressure (14 mm Hg) to a quantity of about 10 milliliters, whereupon the concentrated solution was kept for 24 hours at room temperature. Subsequently, the product which had crystallized out was filtered off, washed with acetone and dried.

2.7 g of 1-ureido-4-cyanovaleramide, having a melting point of 158°–159.5°C, were obtained.

Analysis: 45.8% by weight of C 6.7% by weight of H, 18.1% by weight of O and 29.7% by weight of N (calculated analysis for $C_7H_{12}O_2N_4$: 45.64% by weight of C, 6.57% by weight of H, 17.37% by weight of O and 30.42% by weight of N).

The infrared spectrum and the nuclear-magnetic resonance spectrum of the product obtained were quite in agreement with the structure:

$NC—(CH_2)_3—CH(NHCONH_2)—CONH_2$

EXAMPLE 3

Preparation of lysine dihydrochloride from 1-ureido-4-cyanovaleramide.

To a 1 liter autoclave provided with a stirrer, 1.5 g of Raney nickel and 50 milliliters of methanol were added. The autoclave was closed, whereupon 40 g of ammonia were added and hydrogen was forced into the autoclave until a pressure of 20 atmospheres was reached. While stirring, the temperature was then raised to 110°C and the pressure increased to 70 atmospheres by supply of hydrogen. Next, a solution of 7.8 g of 1-ureido-4-cyanovaleramide and 15 g of ammonia in 150 milliliters of methanol were added, the temperature and the pressure being maintained until hydrogen was no longer taken up by the reaction mixture. During this procedure the reaction mixture was continually and thoroughly stirred. After cooling and release of pressure, the reaction mixture was filtered and the filtrate evaporated will nearly dry. The residue containing 1-ureido-5-aminocapronamide, together with 100 milliliters of hydrochloric acid (36% by weight of (HCl), was heated for 4 hours to 170°–180° C in an autoclave, whereupon the resulting solution was evaporated till dry. The residue thereby obtained contained 8.8 g of lysine dihydrochloride, which corresponds with a conversion of 94.8% based on the original quantity of 1-ureido-4-cyanovaleramide.

EXAMPLE 4

Preparation of lysine dihydrochloride from the mixture obtained according to example 1.

To a 1 liter autoclave provided with a stirrer, 1 g of Raney nickel, 100 milliliters of methanol and 70 g of ammonia were added. After the autoclave had been closed, hydrogen was forced into the autoclave until a pressure of 20 atmospheres had been reached. Subsequently, and with stirring, the temperature was raised to 110°C, the pressure being increased to 62 atmospheres by supply of hydrogen. While stirring the catalyst suspension so obtained, a solution of 12 g of 5-(3-cyanopropyl)-hydantoin, 2.4 g of 1-ureido-4-cyanovaleramide and 20 g of ammonia in 200 milliliters of methanol was added, whereupon stirring was continued until hydrogen was no longer taken up by the reaction mixture. After cooling and release of pressure, the reaction mixture was filtered and the filtrate evaporated till dry under reduced pressure (20 mm Hg). The residue obtained was converted into lysine dihydrochloride in the same manner as in example 3, yielding 16.2 g of lysine dihydrochloride, which corresponds to conversion of 87.3% based on the original quantity of 5-(3-cyanopropyl)-hydantoin and 1-ureido-4-cyanovaleramide provided.

EXAMPLE 5

Preparation of lysine monohydrochloride from a mixture of 5-(3-cyanopropyl)-hydantoin and 1-ureido-4-cyanovaleramide.

To a 1 liter autoclave provided with a stirrer, 2 g of Raney nickel and 50 milliliters of water were added. After the autoclave had been closed, 70 g of ammonia were added and hydrogen was forced into the autoclave until a pressure of 40 atmospheres was reached. Subsequently, and with stirring, the temperature was raised to about 110°C and the pressure increased to 65 atmospheres by supply of hydrogen. While stirring, a solution of 14.2 g of 5-(3-cyanopropyl)-hydantoin, 2.8 g of 1-ureido-4-cyanovaleramide, 9.6 g of ammonium carbonate and 11 g of ammonia in 100 milliliters of water was added to the catalyst suspension so obtained, the solution added having been obtained by reaction of 4-cyanobutyraldehyde with hydrogen cyanide and ammonium carbonate as in example 1. After the solution had been added, stirring was continued, and the temperature and the pressure were maintained until hydrogen was no longer taken up by the reaction mixture. After cooling and release of pressure, the reaction mixture was filtered and the filtrate evaporated till nearly dry. The resulting residue, together with 12 g of sodium hydroxide and 85 milliliters of water, was heated to 200°C in an autoclave for 2 hours. The resulting solution was then partly evaporated, to remove the ammonia present in the solution. The remaining solution of sodium lysinate, still containing some sodium carbonate, was diluted with water to a volume of 200 milliliters and passed over a column filled with 300 milliliters of strongly acidic ion exchanger (polystyrene linked with 8% of divinyl benzene containing sulphonic acid groups, known by the trade name of Dowex 50) in the $NH_4^+$ form. The column was subsequently flushed with water until the liquid passing through reacted neutrally.

The lysine bound to the ion exchanger was then removed by passing 200 milliliters of ammonia water (7% of $NH_3$ by weight) over the column and flushing the column with distilled water until the liquid passing through reacted neutrally. The total quantity of extract obtained was evaporated until the solution no longer contained any ammonia. The resulting aqueous lysine solution was neutralized with hydrochloric acid and evaporated till dry. The residue thereby obtained contained 16.55 g of lysine monohydrochloride, which corresponds with a conversion of 90.4% based on the original quantity of 5-(3-cyanopropyl)-hydantoin and 1-ureido-4-cyanovaleramide provided.

What is claimed is:

1. 1-ureido-5-aminocapronamide.

* * * * *

UNITED STATES PATENT OFFICE
CERTIFICATE OF CORRECTION

Patent No. 3,891,702             Dated    June 24, 1975

Inventor(s) Geertrudes H. Suverkropp and Werner Reichrath

It is certified that error appears in the above-identified patent and that said Letters Patent are hereby corrected as shown below:

In the heading insert --Claims priority of

Netherlands application No. 7018704 filed

December 23, 1970.--

Signed and Sealed this

*thirtieth* Day of *December 1975*

[SEAL]

Attest:

RUTH C. MASON
*Attesting Officer*

C. MARSHALL DANN
*Commissioner of Patents and Trademarks*